United States Patent [19]

Buck

[11] 3,817,536

[45] June 18, 1974

[54] SELECTABLE VOICE UNIT

[75] Inventor: Gordon H. Buck, Torrance, Calif.

[73] Assignee: Mattel, Inc., Hawthorne, Calif.

[22] Filed: Oct. 24, 1972

[21] Appl. No.: 300,096

Related U.S. Application Data

[63] Continuation of Ser. No. 147,938, May 28, 1971, abandoned.

[52] U.S. Cl. .................................... 274/1 A
[51] Int. Cl. .................................... G11b 3/00
[58] Field of Search ........................... 274/1 A

[56] References Cited

UNITED STATES PATENTS

| | | | |
|---|---|---|---|
| 3,510,966 | 5/1970 | Golden et al. | 274/1 A |
| 3,741,566 | 6/1973 | Baynes et al. | 274/1 A |

*Primary Examiner*—Harry N. Haroian
*Attorney, Agent, or Firm*—Max E. Shirk; Franklin D. Jankosky

[57] ABSTRACT

A simple toy phonograph which enables a child to rotate a selector dial to select one of several sound tracks to be played. The phonograph includes a turntable with a record that carries several spiral grooves, the groove to be played being determined by the rotational position by which the turntable stops during windup of the spring. In one phonograph, the spring carries a stop, so that as the spring becomes fully wound onto the turntable, the spring stop engages another stop on the selector dial to prevent further reverse turntable rotation. In another phonograph, the spring is carried on, and anchored to, a drum mounted on the selector dial, and the turntable suddenly stops rotating in reverse when the spring is fully unwound from the drum.

18 Claims, 13 Drawing Figures

INVENTOR.
GORDON H. BUCK
BY Max E. Shirk
ATTORNEY

INVENTOR.
GORDON H. BUCK
BY Max E. Shirk
ATTORNEY

INVENTOR.
GORDON H. BUCK
BY Max E. Shirk
ATTORNEY

SELECTABLE VOICE UNIT

This is a continuation of application Ser. No. 147,938, now abandoned, filed May 28, 1971.

BACKGROUND OF THE INVENTION

This invention relates to toy phonographs.

DESCRIPTION OF THE PRIOR ART

One type of toy phonograph includes a turntable that carries a disc record, the disc record having several interleaved spiral grooves with leadin portions spaced about the periphery of the record. When a child pulls a cord, the cord unwinds from the turntable while a power spring winds onto the turntable. When the cord is released, the spring drives the turntable in a forward direction while a needle falls into a record groove to play it. The particular record groove which will be played is determined by the rotational position at which the record stops at the end of spring winding.

In order to allow a child to select one of the several record grooves to be played, a selector dial can be provided which can be rotated by the child to move a stop about the turntable. The turntable can also carry a stop, so that when the turntable stop reaches the selector dial stop, the turntable cannot rotate any further in reverse and the rotational position of the turntable and therefore the next groove to be played is determined. One problem with such an arrangement is that the power spring generally must be wound several times about the turntable, and a stop fixed to the turntable would allow a maximum of one rotation and generally much less before encountering the selector dial stop. One way of overcoming this problem is to wind the spring on a drum that is coupled by a clutch to the turntable, so that the spring-receiving drum can continue to rotate in reverse by several turns even though the turntable is stopped. However, when the turntable rotates in a forward direction, the turntable stop will hit the selector dial stop after one turn.

Various arrangements have been proposed to move the selector dial stop and the turntable stop out of each other's path during forward turntable rotation, but such mechanisms add complexity and cost to the toy phonograph, whose cost has already been increased by the clutch that allows adequate spring winding. Toy phonographs must be designed as simply as possible, not only to increase their reliability under rough usage, but to allow them to be manufactured and sold at low cost.

OBJECTS AND SUMMARY OF THE INVENTION

An object of the present invention is to provide an extremely simple toy phonograph which enables the manual selection of sound tracks to be played.

Another object is to provide a simple mechanism for enabling the selection of the position at which a toy phonograph turntable stops during reverse rotation, and which does not interfere with forward turntable rotation.

In accordance with one embodiment of the present invention, a simple toy phonograph is provided which enables manual selection of one of several record grooves to be played. The phonograph includes a turntable that carries a disc-like record with several grooves that have circumferentially spaced leadin portions. When a child pulls a cord, the turntable rotates in reverse while a spring winds onto it. When a child releases the cord, the spring drives the turntable in a forward direction. At the beginning of forward rotation, a needle drops onto the record and enters whichever groove lies under it. The phonograph includes a selector dial which can be turned by a child to select which of the grooves will be next played. In accordance with the invention, the spring is constructed and mounted to limit the amount of reverse turntable rotation so that the selected record groove lies under the needle when the spring is apparently fully wound.

In one phonograph, the selector dial carries a first stop and the spring carries a second stop. The spring stop moves onto the turntable near the end of windup, to engage the selector dial stop and prevent further reverse turntable rotation. The turntable can rotate several times before the portion of the spring containing the spring stop moves onto the turntable and engages the selector dial stop.

In another phonograph, a spring supply drum that pays out the spring as it is wound onto the turntable, is rotatably mounted on the selector dial. When the spring, whose inner end is firmly anchored to the supply drum, becomes fully unwound from the supply drum, it prevents further reverse rotation of the turntable. If a child turns the selector dial, the spring supply drum advances about the turntable and alters the position at which the turntable stops.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
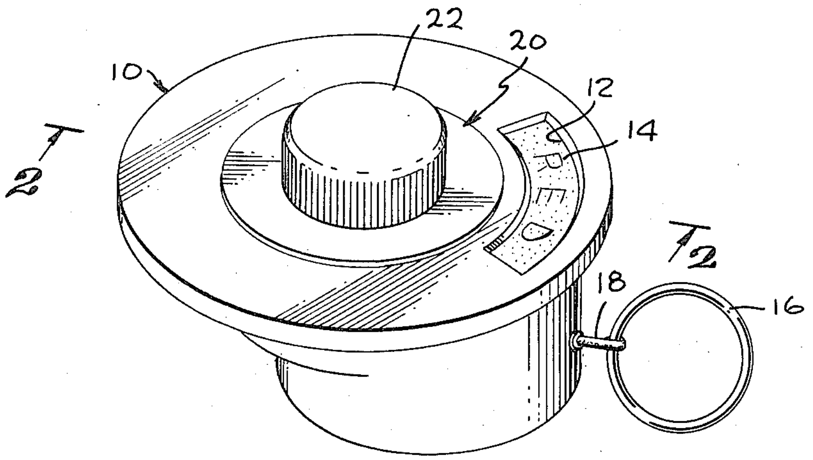
FIG. 1 is a perspective view of a toy phonograph constructed in accordance with one embodiment of the present invention.

FIG. 1 illustrates a toy phonograph which includes a housing 10 with a window 12 that displays one of five different markings 14. When a child pulls a ring 16 at the end of a cord 18, and then releases the ring, the phonograph plays a saying which corresponds to the particular marking 14 which is displayed. The marking 14 may be a picture or word, the particular phonograph which is illustrated in the Figures bearing the names of five different colors. The saying which is played when the color "red" is displayed may be, for example, "Strawberries and sunsets are red." The markings 14 are carried by a selector dial 20, and a child can turn a knob 22 of the dial to cause a different one of the five markings to be displayed. Whenever the cord 18 is pulled, the saying which is played always corresponds to the marking which is displayed through the window 12.

Figure 2:
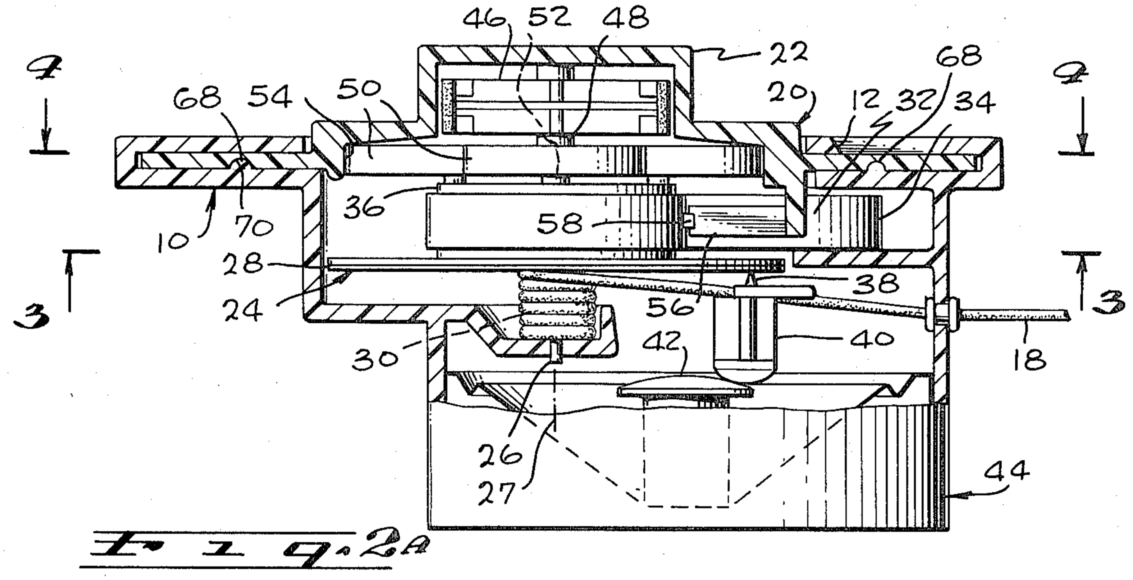
FIG. 2 is a view taken on the line 2—2 of FIG. 1.

As shown in FIG. 2, the phonograph includes a turntable 24 which has a shaft 26 that rotates about an axis 27. One end of the turntable shaft 26 is rotatably mounted on the housing 10 while the other end is rotatably mounted on the selector dial 20, which therefore also serves as part of the housing. The turntable carries a disc-like record 28 which has several spiral grooves thereon. When a child pulls on the cord 18, the cord unwinds from a cord-receiving drum 30 of the turntable to rotate the turntable in reverse. During such reverse rotation, a spring 32 unwinds from a coil 34 disposed on the housing 10, and onto a spring-receiving portion 36 of the turntable. When the cord 18 is released, the spring 32 winds off the turntable portion 36 and back into the coil 34, to turn the turntable in a forward direction. The cord 18 then rewinds onto the cord-receiving drum 30 of the turntable.

During forward rotation of the turntable, a needle 38 of a tone arm 40 moves against the record 28 to engage one of the record grooves and play it. Vibrations of the needle 38 are transmitted to the tone arm 40 and from the tone arm to the armature 42 of a speaker cone assembly 44 that acoustically amplifies the vibrations. In order to regulate the speed of the turntable during forward rotation, a governor 46 is provided whose hub 48 is driven by three planetary members 50. The planetary members 50 are rotatably mounted on pivots 52 on the turntable, and have peripheries engaged with a raceway 54 of the selector dial 20. As the turntable rotates, the governor 46 is driven at a much higher speed, and it prevents excessive turntable speed.

Figures 3, 4, 6, 7, 8:
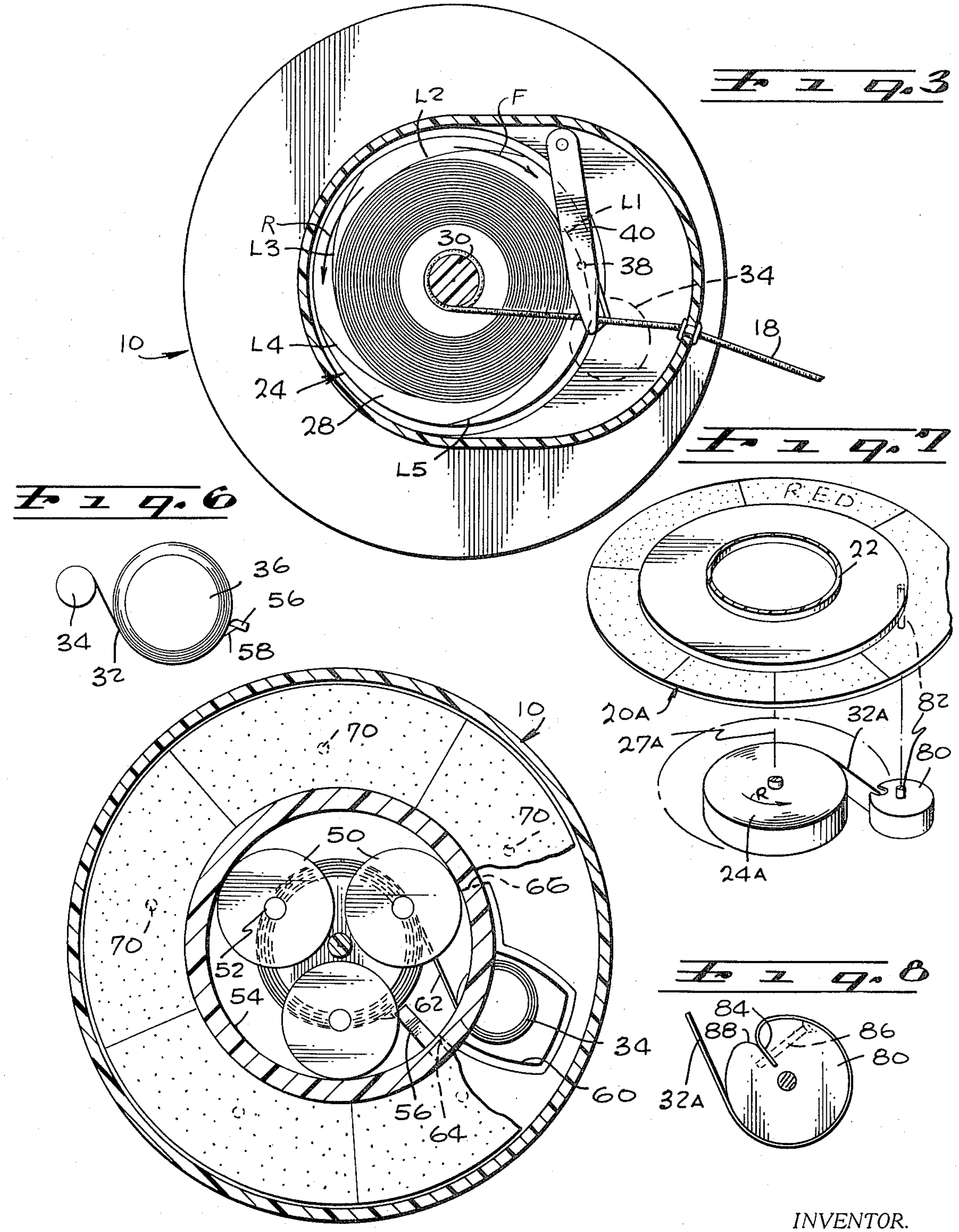
FIG. 3 is a view taken on the line 3—3 of FIG. 2.
FIG. 4 is a view taken on the line 4—4 of FIG. 2.
FIG. 6 is a view similar to FIG. 5, but showing the selector mechanism in another configuration to select another record groove.
FIG. 7 is a partial perspective view of a toy phonograph constructed in accordance with another embodiment of the invention.
FIG. 8 is a partial plan view of the spring-supply drum of the phonograph of FIG. 7.

The cord 18 extends through the tone arm 40, to lift the tone arm off the record when the cord is pulled and is therefore under tension. When the cord 18 is released and therefore not under tension, a spring (not shown) which biases the speaker armature 42 towards the record, pushes the tone arm 40 against the record. Thus, as the turntable begins rotating in a forward direction, the needle 38 moves against the record 28 to engage one of the grooves therein. FIG. 3 illustrates the form of the record 28, the record having five interleaved spiral grooves with lead-in portions L1 through L5 circumferentially spaced about the axis of rotation of the record. Although the lead-in portions are shown near the periphery of the record, they could lie near its center in the case of a phonograph wherein the needle moves outwardly as it follows a groove. The particular groove which the needle 38 plays is determined by the particular leadin portion which the needle 38 first encounters. The needle encounters a lead-in groove portion when the turntable and record begin rotating in a forward direction, as indicated by the arrow F. Accordingly, the groove which is played is determined by the rotational position at which the turntable stops during reverse rotation (in the direction of arrow R) during pulling of the cord and windup of the spring.

Figure 2A:
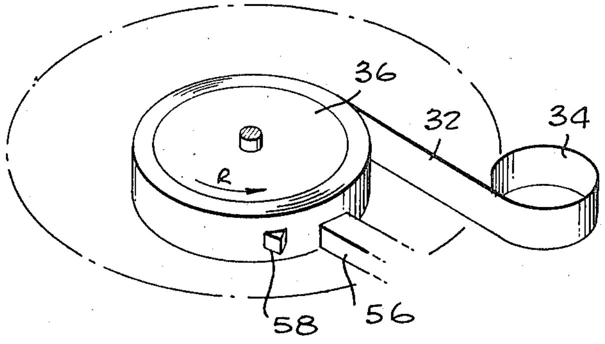
FIG. 2A is a partial perspective view of the phonograph of FIG. 1, showing its principal of operation in the selection of record grooves.

As shown in FIGS. 2, 2A, and 4, the selector dial or wheel 20 carries a stop 56 that advances about the axis of rotation 27 of the turntable as the knob 22 is turned. The selector stop 56 can engage another stop 58 positioned on the turntable (actually, the stop 58 is fixed to the spring, as will be described below), to prevent further reverse turntable rotation. This determines the turntable position, to thereby determine the groove that will be played when the turntable begins rotating in a forward direction. In accordance with the present invention, the stop 58 is fixed to the spring 32 near the inner end thereof that becomes wound on the turntable near the end of spring windup. During the beginning of spring windup, the spring stop 58 is held in the spring coil 34 that is retained in a spring-receiving portion of the housing 10. Thus, the turntable can make several reverse rotations without engagement of the spring stop 58 with the selector stop 56. However, as the spring becomes fully wound, the spring portion which holds the stop 58 becomes wound on the turntable and rotates in reverse with it. The spring stop 58 then moves in a path that brings it into engagement with the selector stop 56. When this occurs, the turntable 24 cannot rotate any further in reverse, and it stops. As discussed above, the particular position at which the turntable halts during reverse rotation determines which record groove will be played when the turntable begins rotating in the forward direction.

Figure 5:
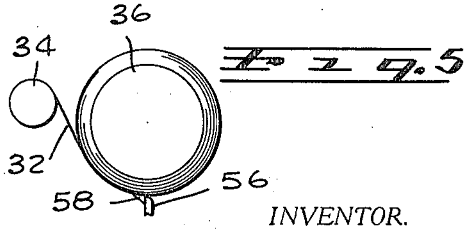
FIG. 5 is a partial view of the phonograph of FIG. 4, showing the selecting mechanism in a first orientation to select a first record groove.

A child can select a different record groove to be played by turning the selector knob 22. Turning of the knob 22 causes the selector stop 56 to advance about the turntable, and therefore alters the rotational position of the turntable at which the spring stop 58 engages the selector stop 56. The selector knob 22 and selector stop 56 can be rotated within a wide range that extends almost a full turn. FIGS. 5 and 6 show the selector stop 56 in two rotational positions to select two different record grooves. The selector stop 56 should not rotate so far that it reaches the path region 62 (FIG. 4) along which the spring moves onto and off from the turntable, or it could interfere with spring winding. To prevent this, limiting walls 64 and 66 are provided on the housing that engage the selector dial stop 56 to limit its extremes of travel.

The mounting of the stop 58 on the spring 32 allows several functions to be performed in a very simple manner. The spring stop 58 enables the turntable to be rotated by several turns in reverse before the turntable is stopped. In addition, the stop 58 moves out of the way of the selector stop 56 when forward turntable rotation begins, so that there is no engagement of the stops during playing of the record. If a stop were fixed to the turntable instead of to the spring, such a stop would not only prevent more than one reverse turntable rotation but would also prevent more than one forward turntable rotation.

In prior mechanisms, clutches have been employed which allowed the spring to be wound several times about the turntable while the record was being held by a stop against further reverse turntable rotation, to permit substantial spring windup. The clutch then engaged the record with the drum about which the spring was wound, so that the spring could turn the turntable several times in a forward direction. However, additional mechanisms were then required to shift the turntable stop out of the path of the selector stop to prevent engagement of the stops during forward turntable rotation. Relatively complex mechanisms were required to achieve these functions which, in the present invention, may be achieved by merely mounting the turntable stop on the spring which winds onto and off the turntable.

While the spring stop 58 is shown mounted on the same spring 32 that powers the turntable, it is possible to mount the stop 58 on a different member. Thus, a separate cable could be provided that wound onto and off from a portion of the turntable and which carried the stop 58. Such a mechanism will be described below, in connection with FIGS. 9–12. It is also possible to mount a stop on the spring 32 in an axially extending orientation so that, instead of extending from the radially outer face of the spring, the stop extends primarily axially. In that case, the selector stop 56 can be mounted so it does not cross the path region 62 of the spring as it moves onto or off the turntable, and it may not be necessary to limit rotation of the selector dial. It is further possible to construct the phonograph so that the spring winds onto and off from a wheel that is geared to the turntable, instead of winding directly onto the turntable, or even to use an auxiliary wheel geared to the turntable to rotate with it but at a reduced speed, the wheel carrying a stop fixed thereon to engage a selector stop.

When the spring stop 58 engages the selector dial stop 56, there is a tendency for the selector dial to be turned in reverse. Excessive reverse rotation of the selector dial would allow the turntable to rotate too far in reverse and prevent proper selection of the next record groove to be played. The stop 56 is at a small distance from the axis of turning 27 of the selector dial, so only a small torque is applied to it, and friction can prevent reverse dial rotation. However, to further prevent turning of the dial, an indexing protuberance 68 (FIG. 2) is formed in the housing 10 which is received in a recess 70 in the selector dial. The selector dial has five of such recesses 70, corresponding to the five different rotational positions for selecting the five different record grooves. When the spring stop 58 engages the selector stop 56, the selector dial 20 may rotate to a limited extent in the reverse direction, until the protuberance 68 receives one of the recesses 70 in the selector dial. The selector dial then cannot rotate any further in reverse unless a very strong rotating force is applied. The spring stop 58 cannot supply a sufficient torque for this, although a child can. If a child should happen to leave the selector dial 20 in between a pair of rotational positions, the spring stop 58 may push the selector dial into the next position. In this case, the selector dial will be moved automatically to the middle of one of the five rotational positions, and the corresponding record groove will be played. A child can supply sufficient torque to the selector knob 22 to rotate the selector dial, and he will hear a click each time he passes the middle of one of the five positions. Of course, it is possible to employ an indexing mechanism that allows for rotation of the selector dial 20 only in the forward direction of arrow F, to positively prevent reverse rotation of the selector dial past the closest of the five positions.

FIG. 7 illustrates a toy phonograph constructed in accordance with another embodiment of the invention, which includes a spring-holding drum 80 that is rotatably mounted on a post 82 that is fixed to the selector dial 20A. The drum 80 holds a spring 32A which winds onto and off from a turntable 24A. The spring 32A does not carry a stop that moves onto the turntable. Instead, the inner end of the spring 32A is anchored on the drum 80 so that the spring can be unwound to only a certain extent, and thereafter it abruptly stops the turntable 24A from rotating any further in reverse.

FIG. 8 illustrates the construction of the spring-holding drum 80, showing the manner in which the inner end 84 of the spring is held by a pin 86 in a recess 88 formed in the drum. The spring can be easily unwound from the drum until the very last portion is unwound. The spring then suddenly stops unwinding and therefore suddenly prevents any further reverse rotation of the turntable. The particular rotational position of the turntable at which it halts is determined by the position of the drum-holding post 82 about the axis of rotation 27A of the turntable. When a child turns a knob fixed to the selector dial 20A, he advances the post 82 and spring drum 80 thereon, and therefore changes the position at which the turntable will stop during reverse rotation. Accordingly, when the child turns the dial 20A, he selects the next groove to be played.

In some cases, excessive turning of the selector dial 20A in the reverse direction, indicated by arrow R, can cause jamming. This is because the spring 32A cannot be rewound indefinitely onto the drum 80, so that soon the turntable will begin rotating in reverse while the needle is engaged with it. To prevent this, a stop can be provided to prevent excessive turning of the selector dial 20A, particularly in the reverse direction. Such stop means can also prevent the turntable from dragging the selector dial in reverse after the spring is fully unwound. It should be noted that instead of a drum, a spring-surrounding cage of the type shown at 60 in FIG. 4 can be formed on the selector dial to hold the spring on the selector dial. Of course, in that case, the inner end of the spring should be provided with a knob to abruptly prevent exit from the cage.

Figure 9:
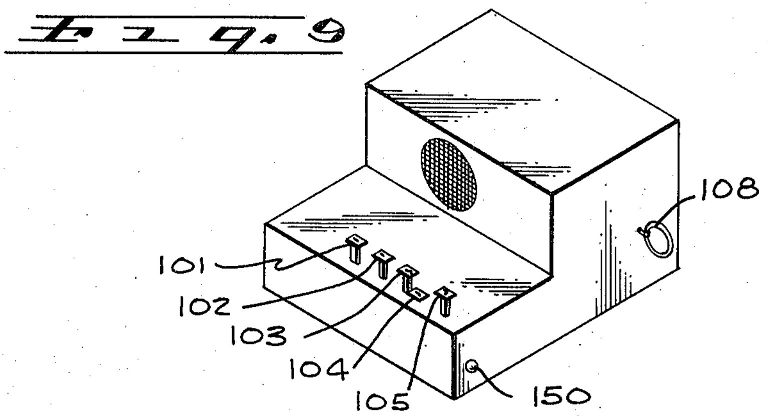
FIG. 9 is a perspective view of a toy phonograph constructed in accordance with still another embodiment of the invention.

FIG. 9 illustrates a toy phonograph constructed in accordance with still another embodiment of the invention, in which a child depresses one of five buttons 101–105 that bear pictures, to select which of five record tracks will be played when he next pulls a pull-ring 108 and releases it. As shown in the partial view of FIG. 10, which does not show the speaker, governor or other well known parts, the phonograph mechanism includes a turntable 110 that can rotate in two directions. The turntable rotates in reverse, as indicated by arrow R, when the pull-ring 108 is pulled out, and rotates in a forward direction, indicated by arrow F, under power of a spring 112, when the pull-ring is released. A separate selector cable or cord 114 is provided, whose opposite ends 114*c* and 114*d* are both anchored on a drum 116 fixed to the turntable. When the turntable rotates in reverse, the selector cord 114 moves in the direction of arrow *r*, and when the record is being played the cord moves in the opposite direction as indicated by arrow *f*. For either direction of selector cord movement, one end portion of the cord unwinds from the drum 116 while the opposite end portion winds further onto it.

Figure 11:
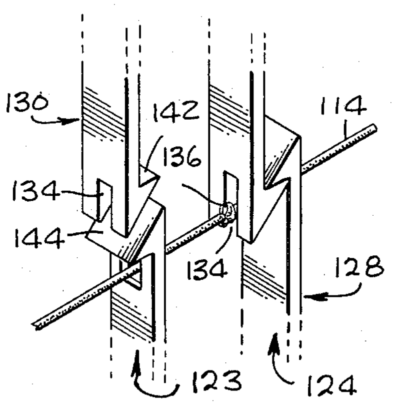
FIG. 11 is a partial perspective view of two selector devices of the mechanism of FIG. 10.
Figure 12:
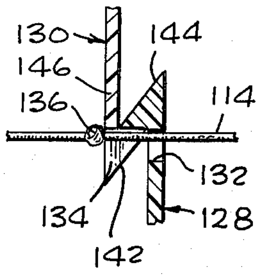
FIG. 12 is a partial sectional view of a selector device of FIG. 11.

The selector cord 114 is guided by pulleys 118 past five sets of selector devices 121–125. Each selector device includes a resilient latch member 128 whose lower end is fixed to the toy housing 129 and a bolt member 130 mounted for up and down sliding on the housing. As shown in FIGS. 11 and 12, each latch member 128 has a large hole 132 for the passage of the selector cord 114, while each bolt member 30 has a narrow slot 134 6hich is only slightly wider than the cord 114. The cord 114 has a knot 136 in it that easily passes through the holes 132 in the latch members, but the knot is stopped at the narrow slot 134 of a bolt member. The knot 136 can engage one of the bolt members 130 so that the selector cord 114 cannot move any further in the reverse direction. The knot 136 on the selector cord can thereby limit winding of the spring and thus select which record track will next be played.

In order to select a record track to be played, a child depresses one of the buttons such as button 104 to slide down a corresponding bolt member 130 against the force of a spring 140. Each bolt member 130 has a hook 142 at its lower end that can engage another hook 144 on the latch member. Thus, once a bolt member 130 is depressed it is retained in its downward position. Each latch member 128 is constructed of resilient material so that it can deflect as the hook 142 of the bolt member moves down across it, and can then spring back to lock the bolt member in the downward position. When a bolt member 130 is locked in the downward position, the cord 114 extends through the narrow slot 134 at the bottom of the bolt member 130.

When a child has depressed one of the buttons, such as button 104, to lock the corresponding bolt 130 in a downward position he can then pull the pull-ring 108 to play a recording. As the spring 112 becomes wound, the knot 136 moves off the drum 116 and begins moving past the row of selector devices 121–125. The knot 136 easily passes through the latch members 128. However, when it reaches the downwardly locked bolt 130 of the selector device 124, it is stopped by the bolt 130, because the knot is too wide to pass through the narrow slot 134. The end portion at **114*d* of the selector cord then cannot wind any further on the turntable drum 116, and the turntable 110 cannot rotate any further in reverse. Accordingly, the rotational position at which the turntable stops during reverse rotation is fixed. The turntable 110 carries a record with circumferentially spaced lead-in groove portions. Thus, when a child releases the pull-ring 108 to allow a tone arm 148 to move down against the record, the groove which is played is determined by the rotational position at which the turntable stopped. The selector devices 121–125 are spaced from one another by distances corresponding to the spacing of the lead-in groove portions about the record. After the record is played, a child can pull a bar 150 to deflect all of the latch members 128 to release whichever bolt, 130** was depressed.

Figure 10:
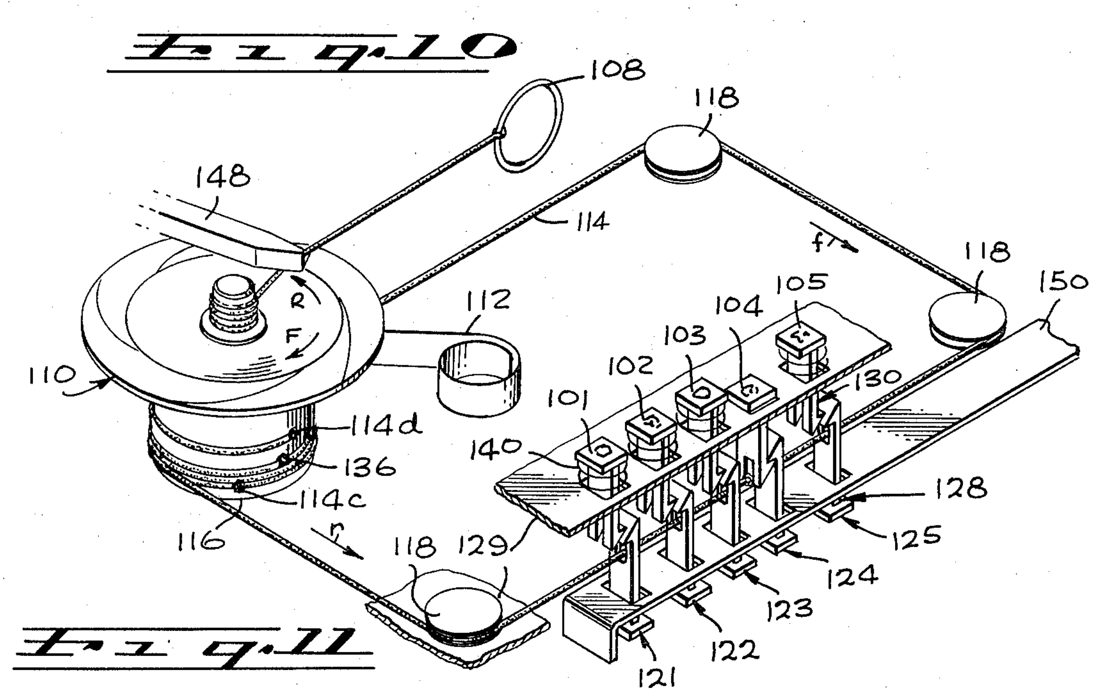
FIG. 10 is a partial perspective view of the mechanism in the toy phonograph of FIG. 9.

Thus, the embodiment of the invention of FIGS. 9–12 utilizes means for stopping the record at a selected rotational position during spring winding, by the manual depression of buttons. Instead of employing a stop on the spring, or means for changing the position of a spring that can be unwound to a definite extent, it utilizes a stop in the form of a knot 136 on a selector cord that moves in direct relationship to the rotation of the turntable. This embodiment of the invention operates in a manner which is largely the reverse of the operation of the apparatus of FIG. 2A wherein a stop moves on to the turntable near the end of spring winding to engage a selector stop that is adjacent to the turntable. In the embodiment of FIG. 10, the stop, in the form of a knot, moves off the turntable to engage a selector stop, formed by the bolt 130, that can engage it only after it moves off the turntable.

Thus, the invention provides toy phonographs constructed with simplified means for limiting the amount by which the spring can be wound onto the turntable in accordance with the position of a selector means. In the embodiments of FIGS. 1–6 and FIGS. 7–8, this is accomplished by providing means on a selector dial that can be directly coupled to the spring to limit the amount by which the spring can be wound. By direct coupling, it is meant that the selector member transmits stopping forces to the spring, and then the spring transmits these stopping forces to the turntable to stop it. This may be contrasted with prior devices wherein stopping forces are transmitted from the selector member to the turntable without these stopping forces passing through the spring. In the embodiment of the invention illustrated in FIGS. 1–6, a stop is mounted on the spring to move onto the turntable near the end of spring windup, the stop being positioned to engage a selector stop, so that the selector stop halts the spring stop which, in turn, halts the turntable to prevent any further reverse rotation of the turntable. In the embodiment of the invention illustrated in FIGS. 7–8, the spring is constructed for unwinding to a limited extent from a supply drum, and the drum is mounted to move about the turntable as the selector dial is turned. When the spring is fully unwound from the supply drum, it tugs at the turntable to prevent further reverse rotation.

In still another embodiment of the invention illustrated in FIGS. 9–12, a selector cord is coupled to the turntable to move back and forth along a cord path as the turntable rotates in reverse and forward directions. The cord has a stop in the form of a knot, that can engage one of several selector devices spaced along the cord path as the turntable rotates in reverse, to prevent further reverse turntable rotation. In each of the embodiments, the phonograph construction enables the selection of record tracks or grooves with a phonograph of minimum complexity, so that the phonograph is rugged and can be constructed at a minimal cost.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a toy phonograph which includes a turntable that carries a disc-like record, the record having grooves with circumferentially spaced lead-in portions, and the phonograph having a needle that moves onto the record to engage one of the lead-in portions of a groove and thereafter play the groove as the turntable begins rotating in a forward direction, the improvement comprising:

a spring coupled to said turntable to turn it in a forward direction;

means for rotating said turntable in a reverse direction which is opposite to said forward direction, to wind said spring from a substantially unwound state; and a rotatably mounted selector member for selecting the record groove to be played, said selector member including means for direct coupling to said spring to limit the amount by which said spring can be wound in accordance with the rotational position of the selector member.

2. The improvement described in claim 1 including:

a first stop coupled to said selector member to move about the axis of rotation of said turntable as said selector member rotates; and wherein said turntable has a spring-receiving drum; and said spring has a normally coiled inner end portion located adjacent to said turntable and an outer end coupled to said spring-receiving drum, so that said spring winds onto said drum as said turntable rotates in said reverse direction, said spring having a second stop mounted thereon for moving onto said drum and engaging said first stop on said selector member to prevent substantial further reverse rotation of said turntable.

3. The improvement described in claim 1 wherein:

said turntable has a spring-receiving drum; and said spring has a normally coiled inner end portion coupled to said selector member so that said inner end portion moves about the axis of rotation of said turntable as said selector member rotates, and said spring has an outer end portion fixed to said spring-receiving drum of said turntable so that said spring winds onto said drum as said turntable rotates in said reverse direction.

4. In a toy phonograph which includes a record mounted on a turntable that rotates in a predetermined reverse direction and then in an opposite forward direction, the record carrying a plurality of tracks, and the phonograph also including tone arm means that selects one of said record tracks to be played in accordance with the position of said record when it stops rotating in said reverse direction, the improvement comprising:

a spring-receiving drum coupled to said turntable to rotate in first and second directions when said turntable rotates in said reverse and forward directions, respectively;

means disposed adjacent to said spring-receiving drum for retaining the inner end of a spring;

a spring having an inner end held at said means for retaining and having an outer end coupled to said spring-receiving drum to wind thereon, said spring having a stop for moving onto said drum near the end of a spring winding thereon; and a selector mounted to turn about an axis substantially coaxial with the axis of rotation of said drum, said selector having a stop for engaging said spring stop when said spring stop is on said drum to halt further rotation of said drum in said first direction.

5. The improvement described in claim 4 wherein:

said spring-receiving drum is fixed to said turntable and said selector is mounted to turn about the axis of rotation of said turntable.

6. A toy phonograph comprising:

a housing;

a turntable rotatably mounted on said housing;

a record fixed to said turntable, said record having a plurality of interleaved spiral grooves with lead-in portions spaced about the axis of rotation of said turntable;

a spring having an inner portion held on said housing and an outer portion coupled to said turntable, so that said spring winds onto said turntable and off it as said turntable rotates in predetermined reverse and forward directions, respectively;

a first stop mounted on said spring to move onto said turntable as said spring becomes fully wound on said turntable;

a selector member pivotally mounted on said housing;

a second stop coupled to said selector member to move about the axis of rotation of said turntable in the path of said first stop when it is on said turntable, as said selector member is moved;

a tone arm having a stylus for moving against said record at a predetermined position with respect to said housing; and means for rotating said turntable in said reverse direction, to wind said spring thereon so it can then rotate said turntable in said forward direction, and for moving said tone arm stylus against said record substantially between the end of reverse rotation and the beginning of forward rotation of said turntable.

7. The toy phonograph described in claim 6 including:

indexing means defining a plurality of rotational positions of said selector member on said housing to resist at least reverse rotation of said selector member past the nearest of said rotational positions.

8. The toy phonograph described in claim 6 wherein:

said spring has a strip shape, with first and second faces which respectively face towards and away from the axis of said turntable when said spring is on said turntable;

said first stop extends from said second face of said strip; and including means defining a pair of limiting surfaces on said housing for preventing movement of said second stop across the path which said spring takes in moving onto and off said turntable.

9. In a toy phonogrpah which includes a record mounted on a turntable that rotates in a predetermined reverse direction and then in an opposite forward direction, the record carrying a plurality of tracks, and the phonograph also including tone arm means that selects one of said record tracks to be played in accordance with the position of said record when it stops rotating in said reverse direction, the improvement comprising:

a spring-receiving drum coupled to said turntable to rotate in first and second directions when said turntable rotates in said reverse and forward directions, respectively;

a selector mounted to turn about an axis substantially coaxial with the axis of rotation of said drum, said selector having means for retaining the inner end of a spring; and a spring having an inner end held at said spring retaining means on said selector and having an outer end coupled to said spring-receiving drum to wind thereon.

10. A toy phonograph comprising:

a housing;

a turntable rotatably mounted on said housing;

a record fixed to said turntable, said record having a plurality of spiral grooves with lead-in portions spaced about the axis of rotation of said turntable;

a selector member rotatably mounted on said housing substantially coaxially with said turntable;

spring holding means mounted on said selector member to rotate with it;

a spring having an outer end mounted on said turntable and having an inner end on said spring holding means so that said inner end rotates about said turntable with said selector member, said inner end of said spring constructed to limit the amount by which it can unwind from said spring holding means;

a tone arm having a stylus for moving against said record at a predetermined position with respect to said housing;

means for rotating said turntable in a predetermined reverse direction to wind said spring thereon, so that said spring can thereafter drive said turntable in a forward direction; and means for moving said tone arm stylus against said record substantially between the end of reverse rotation and the beginning of forward rotation of said turntable.

11. The toy phonograph described in claim 10 wherein:

said spring holding means includes a drum rotatably mounted on said selector member and fixed to said inner end of said spring to abruptly halt spring unwinding therefrom.

12. The toy phonograph described in claim 10 including:

indexing means defining a plurality of rotational positions of said selector member on said housing, said indexing means coupling said selector member to said housing to resist at least reverse rotation of said selector member past the nearest of said rotational positions.

13. In a toy phonograph which includes a record mounted on a turntable that rotates in a predetermined reverse direction and then in an opposite forward direction, the record carrying a plurality of tracks, and the phonograph also including tone arm means that selects one of said record tracks to be played in accordance with the position of said record when it stops rotating in said reverse direction, the improvement comprising:

a cord-receiving drum coupled to said turntable to rotate in said reverse and forward directions with said turntable;

cord means having an end portion mounted on said cord-receiving drum to wind and unwind thereon as said drum rotates in said reverse and forward directions;

stop means fixed to said cord means to move with it;

means for guiding said cord means along a predetermined path; and selector means selectively positionable along said cord path for engaging said stop means to prevent further cord winding onto said drum.

14. The improvement described in claim 13 wherein:

said selector means includes a plurality of selector devices spaced from one another along said cord path and selectively movable into a position to engage said stop means.

15. A toy phonograph comprising:

a housing;

a turntable rotatably mounted on said housing;

a record fixed to said turntable, said record having a plurality of interleaved spiral grooves with leadin portions spaced about the axis of rotation of said turntable;

a spring coupled to said turntable to be wound when said turntable turns in a predetermined reverse direction and to rotate said turntable in an opposite forward direction;

a tone arm having a stylus for moving against said record at a predetermined position with respect to said housing;

means for rotating said turntable in said reverse direction, to wind said spring so it can then rotate said turntable in said forward direction, and for moving said tone arm stylus against said record substantially between the end of reverse rotation and the beginning of forward rotation of said turntable;

a cord having first and second end portions mounted on turntable, so that as one end portion winds off the turntable the opposite end portion winds onto it, and said cord having a center portion;

means for guiding said center portion of said cord along a predetermined path;

stop means on said cord; and selector means for engaging said stop means at a selected position along said cord path as said turntable rotates in said reverse direction, to prevent further reverse rotation of said turntable.

16. Apparatus for use in a toy phonograph which includes a movable record, the record having grooves with spaced lead-in portions, and the phonograph having a needle that moves onto the record to engage one of the lead-in portions of a groove and thereafter plays the groove as the record moves in a forward direction, said apparatus comprising:

power-supply means coupled to said record to move it in a forward direction;

first elongated means coupled to said record for moving said record in a reverse direction which is opposite to said forward direction; and selector means for selecting the record groove to be played, said selector means including second elongated means directly coupled to said record for limiting the amount by which said record can be moved in said reverse direction after said record has moved in said reverse direction a sufficient distance to move all of said lead-in portions past said needle at least once.

17. An apparatus as stated in claim 16 wherein said second elongated means has a first stop means provided thereon and wherein said selector means includes a second stop means which is moved into the path of travel of said first stop means for engagement thereby to limit the amount by which said record can be moved in said reverse direction.

18. An apparatus as stated in claim 17 wherein said second elongated means is a spring and comprises said power-supply means.

* * * * *